(12) United States Patent
Chen et al.

(10) Patent No.: US 9,613,575 B2
(45) Date of Patent: Apr. 4, 2017

(54) LIQUID CRYSTAL DISPLAY DEVICE AND METHOD FOR DRIVING THE LIQUID CRYSTAL DISPLAY DEVICE

(71) Applicant: SHENZHEN CHINA STAR OPTOELECTRONICS TECHNOLOGY CO., LTD, Shenzhen (CN)

(72) Inventors: Wei Chen, Shenzhen (CN); Xiaoping Tan, Shenzhen (CN); Jianjun Xie, Shenzhen (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 430 days.

(21) Appl. No.: 14/360,941

(22) PCT Filed: Mar. 19, 2014

(86) PCT No.: PCT/CN2014/073666
§ 371 (c)(1),
(2) Date: May 28, 2014

(87) PCT Pub. No.: WO2015/139219
PCT Pub. Date: Sep. 24, 2015

(65) Prior Publication Data
US 2015/0264342 A1    Sep. 17, 2015

(30) Foreign Application Priority Data

Mar. 17, 2014  (CN) .......................... 2014 1 0098032

(51) Int. Cl.
*G09G 3/36* (2006.01)
*H04N 13/00* (2006.01)
*G09G 3/00* (2006.01)

(52) U.S. Cl.
CPC .......... *G09G 3/3611* (2013.01); *G09G 3/003* (2013.01); *G09G 3/3648* (2013.01);
(Continued)

(58) Field of Classification Search
None
See application file for complete search history.

(56) References Cited

U.S. PATENT DOCUMENTS

2011/0254837 A1* 10/2011 Kang .................. H04N 13/004
345/419
2012/0212487 A1    8/2012 Basler et al.
(Continued)

FOREIGN PATENT DOCUMENTS

CN    101631200 A    1/2010
CN    102340676 A    2/2012
(Continued)

OTHER PUBLICATIONS

Li Jun, the International Searching Authority written comments, Jan. 2015, CN.

*Primary Examiner* — Dakshesh Parikh

(57) ABSTRACT

A method for driving a liquid crystal display (LCD) device includes: A1: one image frame is extracted from a video; A2: the one image frame is divided into one left-eye image and one right-eye image according to different image arrangements, comparing a color data of the left-eye image with a color data of the right-eye image, and calculating a similarity degree between the left-eye image and the right-eye image of the different image arrangements according to the comparison; and A3: the image arrangement having a maximum similarity degree between the left-eye image and the right-eye image is chosen as a film resource format of a three-dimensional (3D) image of the video to drive the LCD device, and the image arrangement having the maximum
(Continued)

similarity degree between the left-eye image and the right-eye image is the image arrangement of the one image frame.

3 Claims, 6 Drawing Sheets

(52) U.S. Cl.
CPC ..... *H04N 13/0029* (2013.01); *G09G 2340/16* (2013.01); *H04N 2213/007* (2013.01)

(56) References Cited

U.S. PATENT DOCUMENTS

| | | | |
|---|---|---|---|
| 2012/0235996 A1* | 9/2012 | Zhang | H04N 13/0221 345/419 |
| 2012/0242792 A1* | 9/2012 | Zhang | H04N 13/0003 348/43 |

FOREIGN PATENT DOCUMENTS

| | | |
|---|---|---|
| CN | 102547344 A | 7/2012 |
| CN | 102957933 A | 3/2013 |
| CN | 103428515 A | 12/2013 |
| JP | 2013-198155 A | 9/2013 |
| WO | WO2011008821 A1 | 1/2011 |

\* cited by examiner

LIQUID CRYSTAL DISPLAY DEVICE AND METHOD FOR DRIVING THE LIQUID CRYSTAL DISPLAY DEVICE

TECHNICAL FIELD

The present disclosure relates to the field of video processing technology, and more particularly to a liquid crystal display (LCD) device and a method for driving the LCD device.

BACKGROUND

With the development of three-dimensional (3D) technology, 3D images are more prominent in our lives, but a liquid crystal display (LCD) device is necessary to obtain good 3D visuals. A film source format of 3D image generally includes a left and right divided format, an upper and lower partition format, an interlaced format an interlaced column format, and a general two-dimensional (2D) video format. Users need to voluntarily determine the film source format of the 3D image and manually set the film source format. When the users want improve the 3D video effects, the film resource format of the 3D image needs be determined, and then be manually set. Because the users do not completely understand the LCD device, the film source format of the 3D image output by the LCD device is not properly set by the users. However, even if the users know how to set the film source format of the 3D image, the users may still not understand the film source format of the 3D image, which causes inconvenience.

SUMMARY

The aim of the present disclosure is to provide a liquid crystal display (LCD) device and a method for driving the LCD device capable of easily making users enjoy three-dimensional (3D) video effects.

The aim of the present disclosure is achieved by the following methods.

A method for driving a liquid crystal display (LCD) device, comprising:

A1: extracting one image frame from a video;

A2: dividing the one image frame into one left-eye image and one right-eye image according to different image arrangements, comparing a color data of the left-eye image with a color data of the right-eye image, and calculating a similarity degree between the left-eye image and the right-eye image of the different image arrangements according to the comparison; and A3: choosing the image arrangement having a maximum similarity degree between the left-eye image and the right-eye image as a film resource format of a three-dimensional (3D) image of the video to drive the LCD device, and the image arrangement having the maximum similarity degree between the left-eye image and the right-eye image is the image arrangement of the one image frame.

Furthermore, the color data is a data code of red-green-blue (RGB) primary color of each of pixels, and the similarity degree is obtained through directly comparing the data code of RGB primary color of the pixel, which makes the similarity degree between the left-eye image and the right-eye image to be calculated.

Furthermore, in calculating the similarity degree, a pixel difference value of each of the pixels is obtained, and a total difference value of one image frame is obtained.

Furthermore, in calculating the similarity degree, an exclusive-or (XOR) algorithm is used to calculate the pixel difference value, a formula of the XOR algorithm is:

$$P(x,y)=XOR(left(x,y), right(x,y))$$

The f left (x, y) is regarded as the data code of the RGB primary color of the pixel positioning coordinate site (x, y) of the left-eye image, the right (x, y) is regarded as the data code of the RGB primary color of the pixel positioning coordinate site (x, y) of the right-eye image, and the P (x, y) is regarded as the pixel difference value between the pixel positioning coordinate site (x, y) of the left-eye image and the pixel positioning coordinate site (x, y) of the right-eye image.

The XOR algorithm is performed for each of bits of the data code of the RGB primary color of the pixels of the left-eye image and the right-eye image, and the pixels of the left-eye image and the right-eye image are corresponding in position. When values of corresponding bits of the pixels of left (x, y) and right (x, y) are same, number 0 is output. When the values of corresponding bits of the pixels of left (x, y) and right (x, y) are different, number 1 is output. XOR values of different bits of the pixels of left (x, y) and right (x, y) are accumulated to obtain the pixel difference value P between the two corresponding pixels. In the present disclosure, the similarity degree between the left-eye image and the right-eye image is calculated.

Furthermore, in calculating the similarity degree, an accumulation algorithm is used to calculate the total difference value, a formula of the accumulation algorithm is:

$$KX=SUM\{sum[P(x,y)]\}$$

The KX is regarded as the total difference value, P(x, y) is regarded as the pixel difference value between two corresponding pixels, and the two corresponding pixels position coordinate sites (x, y) of the left-eye image and the right-eye image, respectively. The sum(P) is a sum of the pixel difference value of each line of pixels or each column of pixels, and SUM[sum(P)] is a sum of all pixel difference values.

Furthermore, the image arrangement comprises at least two of a left and right divided format, an upper and lower partition format, an interlaced format, and an alternate-column format. The image frame is divided into the left-eye image and the right-eye image according to different image arrangements. The total difference value is obtained through accumulating all pixel difference values between the left-eye image and the right-eye image. At least two of a first total pixel difference value, a second total pixel difference value, a third total pixel difference value, and a fourth total pixel difference value are obtained according to the different image arrangements. A minimum total difference value is obtained through comparing the first total pixel difference value, the second total pixel difference value, the third total pixel difference value, and the fourth total pixel difference value. The image arrangement corresponding to the minimum total difference value is the image arrangement having the maximum similarity degree, namely the image arrangement corresponding to the minimum total difference value is the image arrangement of the image frame, which is the film resource format of the 3D image. The image arrangement corresponding to the minimum total difference value is the image arrangement having the maximum similarity degree.

Furthermore, a threshold is preset, if the minimum total difference value is less than the threshold, the film resource format corresponding to the image arrangement having the minimum total difference value is regarded as the film resource format of the 3D image of the video, and the LCD device is driven. If the minimum total difference value is equal to or greater than the threshold, the similarity degree is false, and returning to the step A1, a new image frame is extracted, and the similarity degree is calculated again. When some wrongs exist in a process of calculating the similarity degree, the LCD device can find the wrongs through the threshold and extract a new image frame to detect the film resource format of the 3D image again.

A liquid crystal display (LCD) device comprises an extracting unit that extracts an image frame from a video, a dividing unit that divides the image frame into a left-eye image and a right-eye image, a similarity degree detection unit that calculates a similarity degree between the left-eye image and the right-eye image, and an outputting unit of a film resource format that controls to output a control signal of the film resource format corresponding to the similarity degree.

Furthermore, the similarity degree detection unit comprises an identification sub-unit and a difference-value-calculation sub-unit. The identification sub-unit identifies and collects data codes of RGB primary color of corresponding pixels of the left-eye image and the right-eye image in position, and the difference-value-calculation sub-unit calculates and obtains pixel difference values of the corresponding pixels through exclusive or (XOR) algorithm and according to the data codes of the RGB primary color of the corresponding pixels, and accumulates all pixel difference values to obtain the total difference value between the left-eye image and the right-eye image. The total difference values corresponding to different image arrangements are compared to obtain a minimum total difference value.

The similarity degree detection unit further comprises a similarity degree determination sub-unit, and the similarity degree determination sub-unit comprises a threshold. If the minimum total difference value is less than the threshold, the outputting unit of the film resource format outputs the control signal controlling the film resource format of the 3D image of the image arrangement having the minimum total difference value. If the minimum total difference value is equal to or greater than the threshold, a new image frame is extracted, and the similarity degree is calculated again. The similarity degree is obtained through directly comparing the data code of RGB primary color of the pixel, which makes the similarity degree between the left-eye image and the right-eye image to be calculated. When some wrongs exist in a process of calculating the similarity degree, the LCD device can find the wrongs through the threshold and extract the new image frame to detect the film resource format of the 3D image again.

Furthermore, the extracting unit, the dividing unit, the similarity degree detection unit, and the outputting unit of the film resource format are arranged in a double data rate (DDR) assembly of a timing controller (TCON) chip of the LCD device. The dividing unit comprises a left and right division sub-unit, an upper and lower division sub-unit, an interlaced division sub-unit, and an interlaced column division sub-unit. In the present disclosure, only DDR assembly of the TCON chip arranged in the LCD device is used, the similarity degree between the left-eye image and the right-eye image can be obtained, and the LCD device can be driven. Additional components are not arranged. Thus, costs are not increased.

In the present disclosure, the one image frame extracted is divided into the left-eye image and the right-eye image according to different image arrangements, and the film resource format of the 3D image is determined by the similarity degree between the left-eye image and the right-eye image, where the similarity degree is obtained through comparing the color data of the left-eye image and the right-eye image. When the 3D video is shown, the LCD device can rapidly and automatically distinguish and output the corresponding film resource format of the 3D image, and the users do not need to judge and manually set the film resource format of the 3D image, which makes the users be convenient.

DETAILED DESCRIPTION

Figure 1:
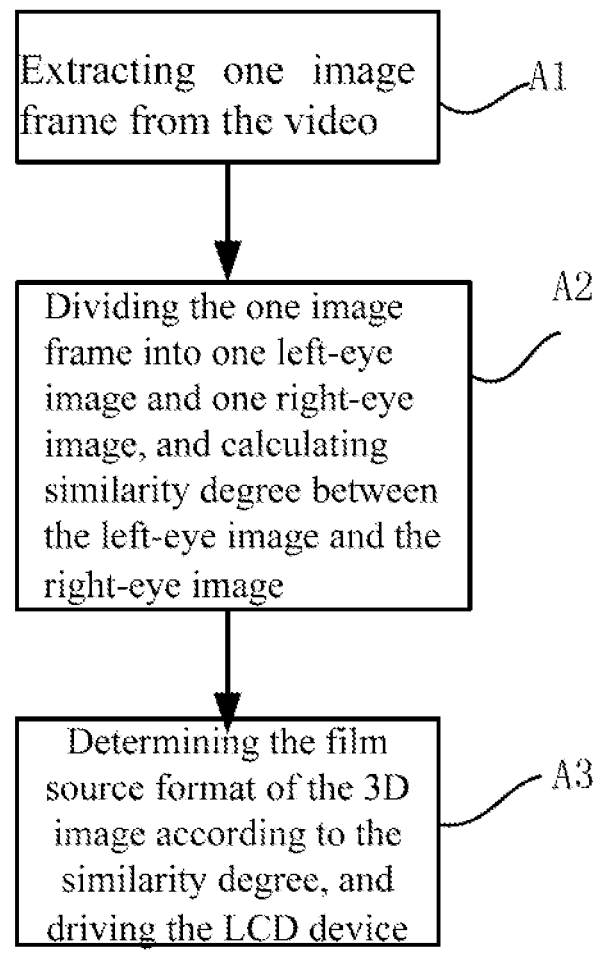
FIG. 1 is a simple flowchart of a method for driving a liquid crystal display (LCD) device of the present disclosure.

FIG. 1 is a simple flowchart of a method for driving a liquid crystal display (LCD) device of the present disclosure. The method comprises:

A1: extracting one image frame from a video;

A2: dividing the one image frame into one left-eye image and one right-eye image according to different image arrangements, comparing a color data of the left-eye image with a color data of the right-eye image, and calculating a similarity degree between the left-eye image and the right-eye image of the different image arrangements according to the comparison; and A3: choosing the image arrangement having a maximum similarity degree between the left-eye image and the right-eye image as a film source format of a three-dimensional (3D) image of the video to drive the LCD device, where the image arrangement having the maximum similarity degree between the left-eye image and the right-eye image is the image arrangement of the one image frame.

The one image frame can be randomly or regularly extracted from the video.

In the present disclosure, the one image frame extracted is divided into the left-eye image and the right-eye image according to different image arrangements, and the film resource format of the 3D image is determined by the similarity degree between the left-eye image and the right-eye image, where the similarity degree is obtained through comparing the color data of the left-eye image with the color data of the right-eye image. When 3D video is shown, the LCD device can rapidly and automatically distinguish and output the corresponding film source format of the 3D image without first determining and manually setting the film source format of the 3D image, which makes convenient use of the LCD device.

The present disclosure will further be described in detail in accordance with the figures and the exemplary examples.

Example 1

Figure 2:
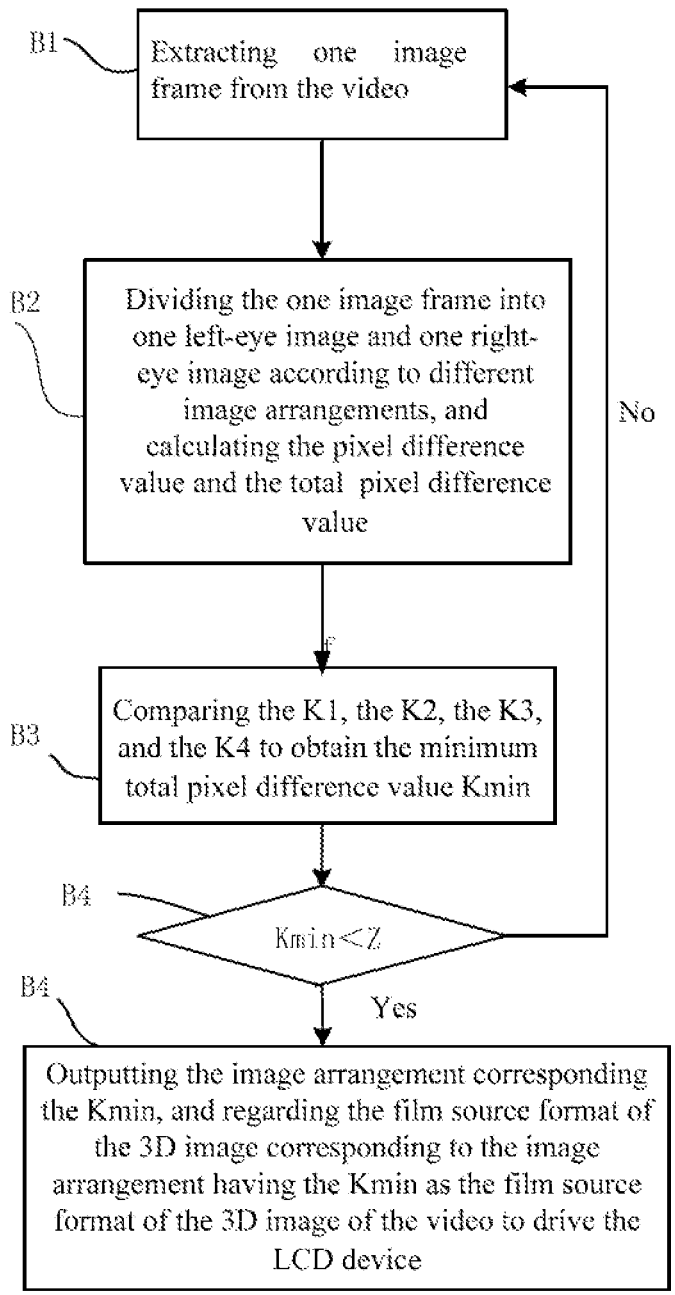
FIG. 2 is a detailed flowchart of a method for driving an LCD device of the present disclosure.

FIG. 2 is a detailed flowchart of the method for driving the LCD device of the present disclosure. The method comprises:

B1: extracting one image frame from the video;

B2: dividing the one image frame into one left-eye image and one right-eye image according to different image arrangements, calculating a pixel difference value according to the color data of pixels of the left-eye image and the right-eye image that are corresponding in position, and summing the pixel difference values of all pixels to obtain a total difference value.

In the present disclosure, at least two total pixel difference values corresponding to any two of a left and right divided format, an upper and lower partition format, an interlaced format, and an interlaced column format are obtained.

The total pixel difference value corresponding to the left and right divided format is regarded as a first total pixel difference value K1, the total pixel difference value corresponding to the upper and lower partition format is regarded as a second total pixel difference value K2, the total pixel difference value corresponding to the interlaced format is regarded as a third total pixel difference value K3, and the total pixel difference value corresponding to the interlaced column format is regarded as a fourth total pixel difference value K4, namely at least two of the K1, K2, K3, and K4 are obtained;

B3: comparing the first total pixel difference value K1, the second total pixel difference value K2, the third total pixel difference value K3, and the fourth total pixel difference value K4 to obtain a minimum total pixel difference value Kmin.

the image arrangement corresponding to the minimum total pixel difference value Kmin is the film source format of the 3D image having the maximum similarity degree;

B4: comparing the minimum total pixel difference value Kmin with a preset threshold Z, if the minimum total pixel difference value Kmin is greater than or equal to the preset threshold Z, returning to the step B1. If the minimum total pixel difference value Kmin is less than the preset threshold Z, doing the step B5; and B5: regarding the film source format of the 3D image corresponding to the image arrangement having the minimum total pixel difference value Kmin as the film source format of the 3D image of the video to drive the LCD device.

Figure 3:
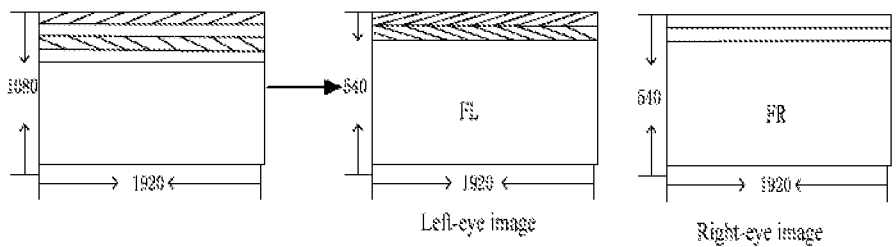
FIG. 3 is a dividing diagram of an image arrangement of a left and right divided format.
Figure 4:
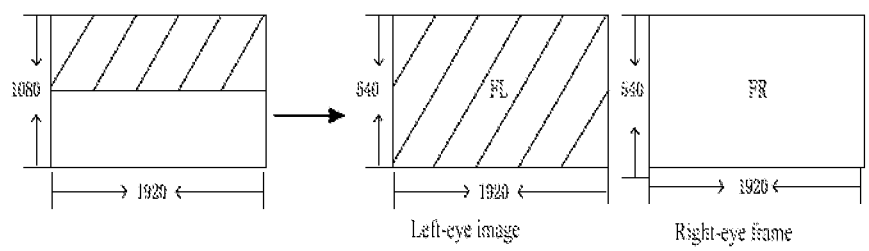
FIG. 4 is a dividing diagram of an image arrangement of an upper and lower partition format.
Figure 5:
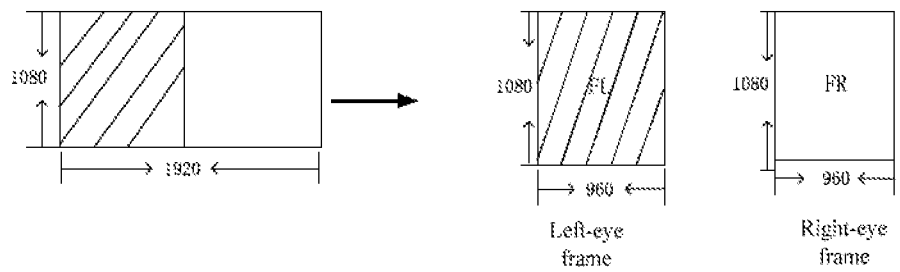
FIG. 5 is a dividing diagram of an image arrangement of an interlaced format.
Figure 6:
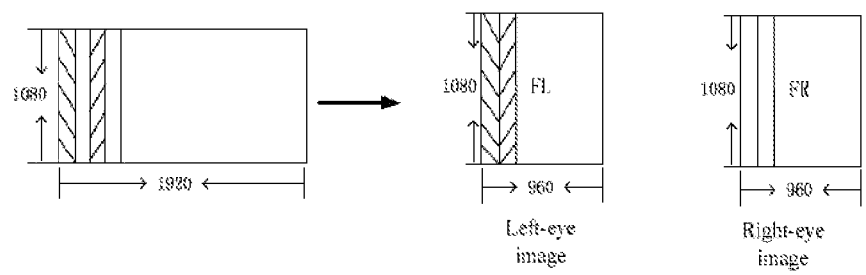
FIG. 6 is a dividing diagram of an image arrangement of an interlaced column format.

In the B2, the image arrangement comprises the left and right divided format, the upper and lower partition format, the interlaced format, and the interlaced column format. As shown in FIG. 3-FIG. 6, the left-eye image FL and the right-eye image FR are obtained through dividing the one image frame according to the above-mentioned four formats. FIG. 3 is a dividing diagram of the image arrangement of the left and right divided format, FIG. 4 is a dividing diagram of the image arrangement of the upper and lower partition format, FIG. 5 is a dividing diagram of the image arrangement of the interlaced format, and FIG. 6 is a dividing diagram of the image arrangement of the interlaced column format. It should be understood that other film source formats of the 3D image can be used in the LCD device, such as a frame sequential format.

In the B2, calculation of the pixel difference value is a part of calculation of the similarity degree, and a calculation method is an exclusive or (XOR) algorithm. The color data is a data code of red-green-blue (RGB) primary color of the pixel, and the pixel difference value is obtained through XOR calculation of different bits of data codes of the RGB primary color of the pixels that are corresponding in positions of the left-eye image and the right-eye image. A formula of the XOR algorithm is:

$$P(x,y)=\text{XOR}(\text{left}(x,y),\text{right}(x,y))$$

The P (x, y) is regarded as the pixel difference value, and left (x, y) and right (x, y) are regarded as two corresponding pixels that position coordinate sites (x, y) of the left-eye image and the right-eye image, respectively. When values of corresponding bits of the pixels of left (x, y) and right (x, y) are same, number 0 is output. When the values of corresponding bits of the pixels of left (x, y) and right (x, y) are different, number 1 is output. XOR values of different bits of the pixels of the left (x, y) and the right (x, y) are accumulated to obtain the pixel difference value P between the two corresponding pixels. Taking RGB primary color having 24 bits as an example, the XOR algorithm is performed for the data code of the RGB primary color having 24 bits. When the data code of one of pixels of the left-eye image is 'FFFFFF', and the data code of one of pixels of the right-eye image corresponding to the one of pixels of the left-eye image is 'FFFFF0', six XOR values are obtained after the XOR algorithm is performed for each of the bits of the pixels, namely 000001 (if the XOR algorithm is performed through using binary system, twenty-four XOR values are obtained), thus, the pixel difference value is 1. It should be understood that the XOR algorithm is not limited to the data code of the RGB primary color having 24 bits, and also is not limited to binary system, octal system, decimal system, hexadecimal system, for example.

In the B2, calculation of the total difference value is a part of calculation of the similarity degree, and the calculation method is an accumulation algorithm. The total difference value corresponds to at least two of image arrangements comprising the left and right divided format, the upper and lower partition format, the interlaced format, and the interlaced column format. And at least two of the first total difference value K1, the second total difference value K2, the third total difference value K3, and the fourth total difference value K4 are obtained. The total difference value is obtained through accumulating the pixel difference values, and the formula is:

$$KX=\text{SUM}\{\text{sum}[P(x,y)]\}$$

The KX is regarded as the total difference value, and x=1-4, which corresponds to different image arrangements. P(x, y) is regarded as the pixel difference value between two corresponding pixels, which position coordinate sites (x, y) of the left-eye image and the right-eye image, respectively. The sum(P) is a sum of the pixel difference value of each line of pixels or each column of pixels, and SUM[sum(P)] is a sum of all pixel difference values.

In the B2, the total difference value and the pixel difference value between the left-eye image and the right-eye image, which correspond to different image arrangements, can be obtained after the left-eye image and the right-eye image are divided according to all different image arrangements. It should be considered that, after the left-eye image and the right-eye image are divided according to one of image arrangements, the total difference value and the pixel difference value between the left-eye image and the right-eye image, which correspond to the one image arrangement, can be obtained immediately. And the total difference value and the pixel difference value between the left-eye image and the right-eye image, which correspond to the other image arrangements, can be obtained successively In the B4, the threshold Z is preset for preventing some interference factors that affect the similarity degree calculation, such as unsuccessfully or incompletely extracting one image frame. If the minimum total difference value Kmin is less than the threshold Z, the calculation of the similarity degree is right, and the image arrangement corresponding to the minimum total difference value Kmin is ensured to be the film source format of the 3D image. If the minimum total difference value Kmin is very great, and is greater than or equal to the threshold Z, serious defects exist in a process of the calculation of the similarity degree, thus, the total difference value needs be tested again.

In the example, the similarity degree is obtained through comparing each of the bits of the data code of the RGB primary color of the pixel, where the data code is not converted and divided, and is immediately compared by ROX, which largely avoids data loss and image distortion, thereby ensuring accuracy of the data, and further ensuring the similarity degree obtained according to the data. Thus, accuracy of the film source format of the 3D image output is ensured.

In the present disclosure, the method for driving the LCD device directly uses the video data input, and calculates the similarity degree according to the non-converted data code of the RGB primary color, which makes the LCD device automatically detect the film source format of the 3D image and largely reduce data loss and image distortion, thereby improving detection accuracy of the film source format of the 3D image. Additionally, the threshold is preset, which avoids some factors that affect detection result in the process of the similarity degree calculation. Thus, the accuracy and the reliability of detecting the film source format of the 3D image are improved.

Example 2

A second example improves according to the first example, and some differences exist between the first example and the second example. In the second example, the color data is gray scale luminance of the pixel, the pixel difference value is obtained through comparing two pixels that are corresponding in positions of the left-eye image and the right-eye image, and the total difference value is obtained through accumulating the pixel difference values of all pixels of the left-eye image and the right-eye image.

The pixel difference value is obtained through performing the XOR algorithm for the gray scale luminance of three sub-pixels of the pixel. For example, levels of the luminance of the three sub-pixels (red, green, and blue) of one of the pixel of the left-eye image are 100, 200, and 300, respectively. Levels of the luminance of the three sub-pixels (red, green, and blue) of one of the pixel of the right-eye image are 100, 200, and 200, respectively, where the one of the pixel of the right-eye image corresponds to the one of the pixel of the left-eye image. The XOR algorithm is performed, and the XOR result of (0, 0, 1) is obtained. Thus, the pixel difference value between two pixels is 1.

The total difference value is obtained through accumulating the pixel difference values of all pixels of the left-eye image and the right-eye image.

In the second example, the gray scale luminance of three sub-pixels (red, green, and blue) are regarded as a whole, and the XOR algorithm is performed for the gray scale luminance of three sub-pixels (red, green, and blue), which makes the similarity degree calculation easy.

Example 3

Figure 7:
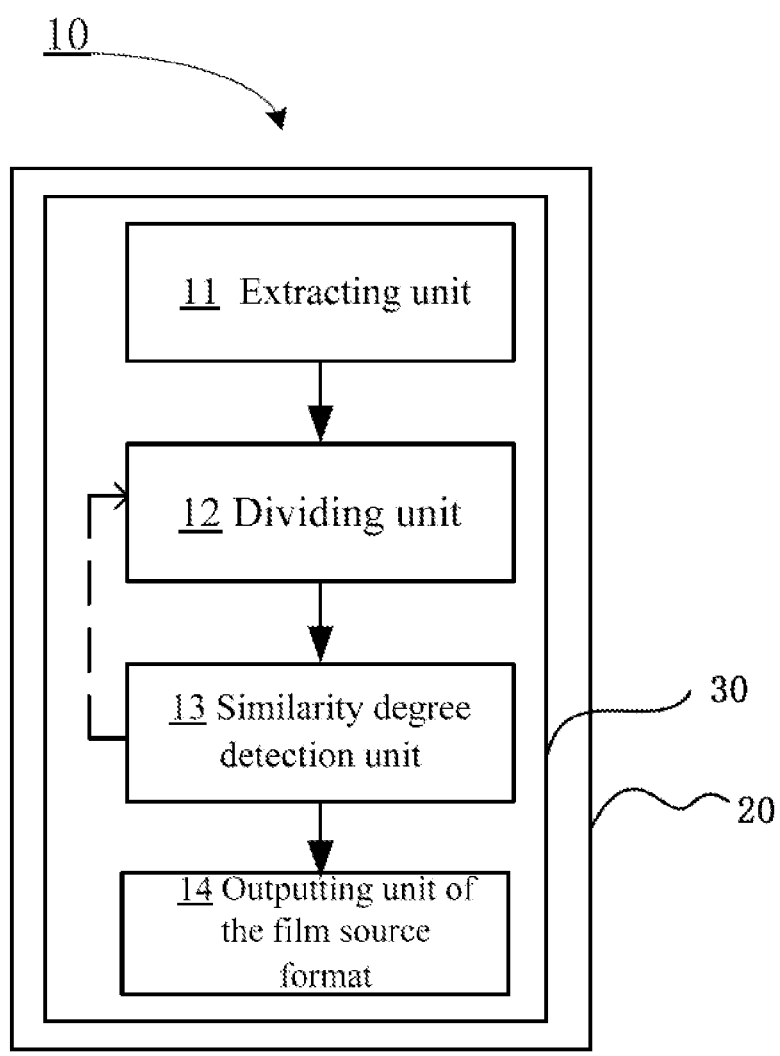
FIG. 7 is a simple structural diagram of an LCD device of the present disclosure.

FIG. 7 is a simple structural diagram of the LCD device of the present disclosure, and only some components making the LCD device automatically detect are shown. The LCD device 10 comprises an extracting unit 11 that extracts the image frame from the video, a dividing unit 12 that divides the image frame into the left-eye image and the right-eye image, a similarity degree detection unit 13 that calculates the similarity degree between the left-eye image and the right-eye image. An outputting unit 14 of the film source format that controls to output a control signal of the film source format corresponding to the similarity degree. The LCD device 10 extracts the image frame through the extracting unit 11, and divides the image frame into the left-eye image and the right-eye image through the dividing unit 12 and according to different image arrangements. The similarity degree detection unit 13 calculates the similarity degree between the left-eye image and the right-eye image of different image arrangements, and the film source format corresponding to the image arrangement having maximum similarity degree is determined as the film source format of the 3D image of the video. The outputting unit of the film resource format outputs the control signal of the film source format, which corresponds to the film source format of the 3D image of the image arrangement having maximum similarity degree, to drive the LCD device.

The dividing unit 12 and the similarity degree detection unit 13 may be executed in order, and also may not be executed in order. The similarity degree between the left-eye image and the right-eye image, which corresponds to the four image arrangements, can be calculated after the image frame is divided into the left-eye image and the right-eye image according to the four image arrangements. It should be considered that after the image frame is divided into the left-eye image and the right-eye image according to one of four image arrangements, the similarity degree between the left-eye image and the right-eye image corresponding to the one image arrangement can be obtained immediately, and the similarity degree between the left-eye image and the right-eye image corresponding to the other image arrangements can be successively obtained after the image frame is divided into the left-eye image and the right-eye image according to the other image arrangements.

The similarity degree detection unit 13 and the outputting unit 14 of the film source format are arranged on a timing controller (TCON) chip 20, are further arranged in a double data rate (DDR) assembly 30 of the TCON chip 20. In the present disclosure, only the TCON chip arranged in the LCD device is used, and the LCD device can obtain the film source format of the 3D format through the calculation method pre-stored without additional components and increasing costs.

Figure 8:
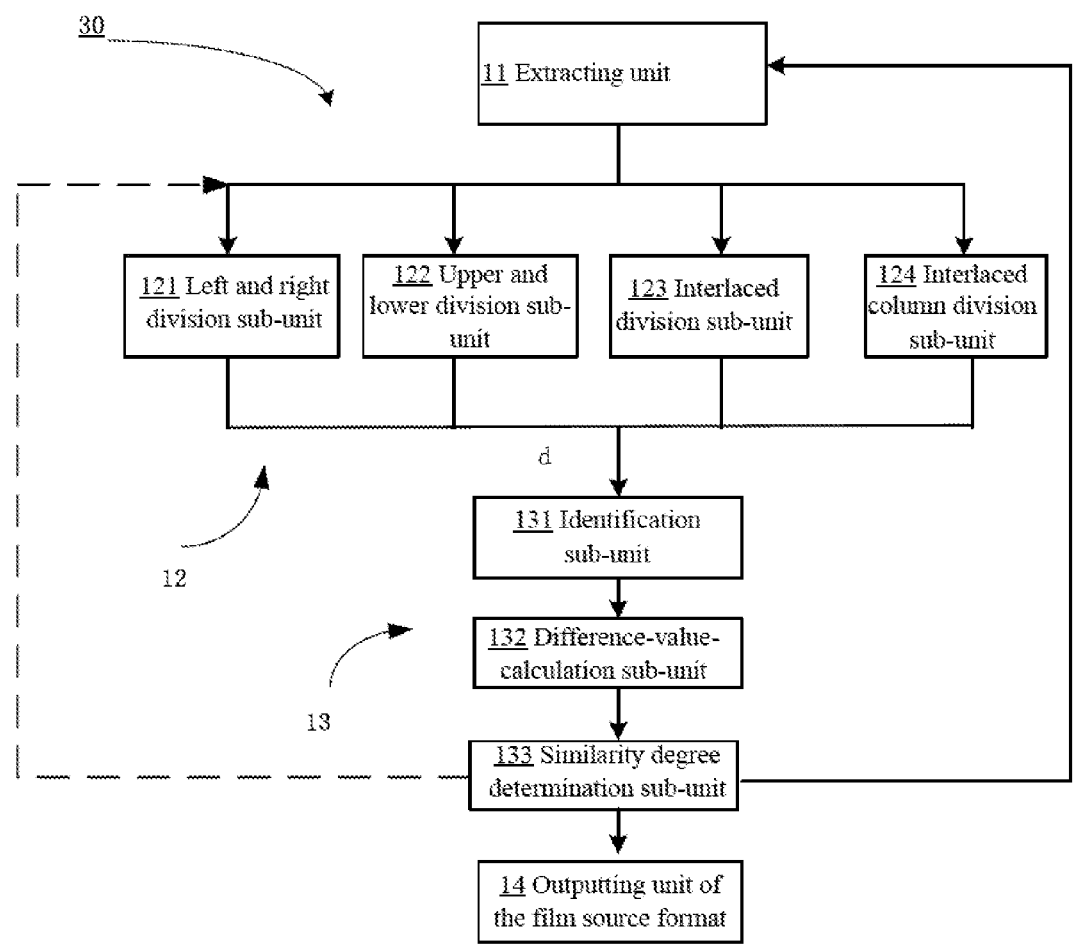
FIG. 8 is a structural diagram of an LCD device of the present disclosure.

FIG. 8 is a detailed structural diagram of the LCD device of the present disclosure, and is improved according to the FIG. 7. The similarity degree detection unit 13 comprises an identification sub-unit 131 and a difference-value-calculation sub-unit 132. The identification sub-unit 131 identifies and collects the data codes of the RGB primary color of the corresponding pixels of the left-eye image and the right-eye image in position, the difference-value-calculation sub-unit 132 calculates and obtains the pixel difference value of the corresponding pixels through the XOR algorithm and according to the data codes of the RGB primary color of the corresponding pixels, and accumulates all pixel difference values to obtain the total difference value between the left-eye image and the right-eye image. The total difference values corresponding to different image arrangements are compared to obtain the minimum total difference value.

The similarity degree detection unit 13 further comprises a similarity degree determination sub-unit 133, and the similarity degree determination sub-unit 133 comprises the threshold. If the minimum total difference value is less than the threshold, the outputting unit of the film source format outputs the control signal controlling the film source format of the 3D image of the image arrangement having the minimum total difference value. If the minimum total difference value is equal to or greater than the threshold, the image frame is extracted again, and the similarity degree is calculated again.

The LCD device detects the film source format of the 3D image through the similarity degree calculation method stored in the DDR assembly 30. Firstly, the LCD device randomly extracts one image frame from the video input through the extracting unit 11. Secondly, the LCD device divides the one image frame into the left-eye image and the right-eye image through using a left and right division sub-unit 121, an upper and lower division sub-unit 122, an interlaced division sub-unit 123, and an interlaced column division sub-unit 124, respectively. And the left-eye image and the right-eye image are the film source format of the 3D image, which corresponds to the left and right divided format, the upper and lower partition format, the interlaced format, and the interlaced column format, respectively Thirdly, the LCD device identifies the data codes of the RGB primary color of all pixels of the left-eye image and the right-eye image corresponding to different image arrangements through the identification sub-unit 131. Fourthly, the XOR algorithm is performed for the data codes of the RGB primary color of two corresponding pixels of the left-eye image and the right-eye image in position to obtain the pixel difference value, and the pixel difference value of all pixels is accumulated to obtain the total difference value between the left-eye image and the right-eye image, where the total difference value is regarded as the first total difference value K1, the second total difference value K2, the third total difference value K3, and the fourth total difference value K4 according to different image arrangements, respectively. Fifthly, The minimum total difference value Kmin is obtained through comparing the first total difference value K1, the second total difference value K2, the third total difference value K3, and the fourth total difference value K4. The image arrangement corresponding to the minimum total difference value Kmin is the image arrangement having the maximum similarity degree. Sixthly, the similarity degree determination sub-unit 133 determines whether the minimum total difference value Kmin is less than the preset threshold, if the minimum total difference value Kmin is less than the preset threshold, the outputting unit 14 of the film resource format outputs the corresponding control signal of the film resource format to drive the LCD device, if the minimum total difference value Kmin is greater than or equal to the preset threshold, the extracting unit 11 extracts a new image frame, and the similarity degree is calculated again.

The identification sub-unit 131 can identify and collect the data codes of the RGB primary color of the two pixels, which are corresponding in positions of the left-eye image and the right-eye image. For example, RGB format having 24 color components has 24 bits, the XOR algorithm is performed for the all bits of two groups of code in the difference-value-calculation sub-unit 132 to obtain 24 results of 1 or 0, the pixel difference value is obtained through accumulating the 24 results of 1 or 0, and the total difference value is obtained through accumulating the all pixel difference values. When the total difference value corresponding to one image arrangement is smaller than the total difference value corresponding to other image arrangements, the left-eye image and the right-eye image divided according to the one image arrangement are similar, namely the film source format of the 3D image corresponding to the one image arrangement is correct.

The control signals of the film source format of the different image arrangements, which correspond to the first total difference value K1, the second total difference value K2, the third total difference value K3, and the first total difference value K4, are pre-stored in the outputting unit 14 of the film source format. When the minimum total difference value Kmin corresponding to the maximum similarity degree is the first total difference value K1, the film source format of the 3D image of the left and right divided format is output. When the minimum total difference value Kmin corresponding to the maximum similarity degree is the second total difference value K2, the film source format of the 3D image of the upper and lower partition format is output. When the minimum total difference value Kmin corresponding to the maximum similarity degree is the third total difference value K3, the film source format of the 3D image of the interlaced format is output. When the minimum total difference value Kmin corresponding to the maximum similarity degree is the fourth total difference value K4, the film source format of the 3D image of the interlaced column format is output.

In the present disclosure, the similarity degree calculation method is stored in the DDR assembly, the video data input is divided into the left-eye image and the right-eye image, the similarity degree is obtained through comparing the data code of the RGB primary color of the image frame, and the image arrangement corresponding to the maximum similarity degree is determined as the film source format of the 3D image of the video. Thus, the film source format of the 3D image output by the LCD device is not needed to be manually set. The image frame is directly used to obtain the similarity degree, and is not converted, which largely avoids factors interfering the similarity degree calculation in converting, thereby improving accuracy of detecting the film source format of the LCD device. Additionally, because the threshold is preset, the false similarity degree due to loss of image extracted is avoided, which further improves the accuracy of detecting the film source format of the LCD device.

Example 4

Figure 9:
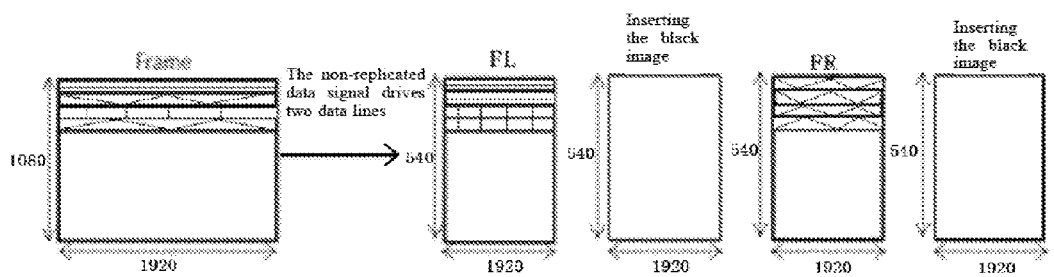
FIG. 9 is an operating diagram of inserting a black image for driving an LCD device under an interlaced format.
Figure 10:
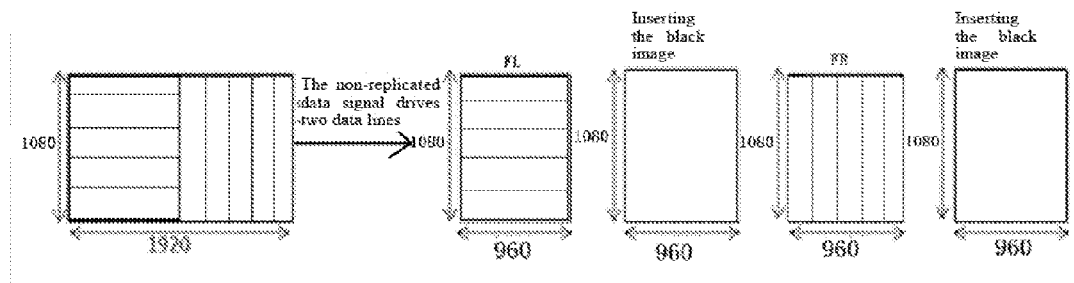
FIG. 10 is an operating diagram of inserting a black image in for driving an LCD device under a left and right divided format.
Figure 11:
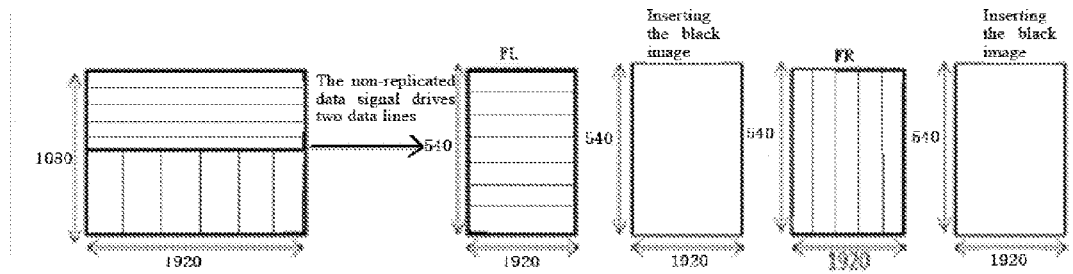
FIG. 11 is an operating diagram of inserting a black image for driving an LCD device under an upper and lower partition format.

FIG. 9-FIG. 11 are operating diagrams of inserting a black image for driving the LCD device, and the LCD device is driven according to the film source format of the 3D image of the interlaced format, the film source format of the 3D image of the upper and lower partition format, and the film source format of the 3D image of the left and right divided format, respectively. When an output of the film source format of the 3D image is driven, a step of inserting the black image needs be performed for the LCD device, namely one frame full black image is inserted between the left-eye image and the right-eye image, where the left-eye image and the right-eye image are consecutive. Thus, cross-talk is avoided between the left-eye image and the right-eye image. Additionally, because image blur exists, video broadcast is not affected in time of inserting the black image, thereby improving television effect of the 3D video.

The present disclosure is described in detail in accordance with the above contents with the specific exemplary examples. However, this present disclosure is not limited to the specific examples. For the ordinary technical personnel of the technical field of the present disclosure, on the premise of keeping the conception of, the technical personnel can also make simple deductions or replacements, and all of which should be considered to belong to the protection scope of the present disclosure.

We claim:

1. A method for driving a liquid crystal display (LCD) device, comprising:
   A1: extracting one image frame from a video;
   A2: dividing the one image frame into one left-eye image and one right-eye image according to different image arrangements, comparing a color data of the left-eye image with a color data of the right-eye image, and calculating a similarity degree between the left-eye image and the right-eye image of the different image arrangements according to the comparison; and
   A3: choosing the image arrangement having a maximum similarity degree between the left-eye image and the right-eye image as a film resource format of a three-dimensional (3D) image of the video, to drive the LCD device, wherein the image arrangement having the maximum similarity degree between the left-eye image and the right-eye image is the image arrangement of the one image frame,
   wherein the color data is a data code of red-green-blue (RGB) primary color of each of pixels, and the similarity degree is obtained through directly comparing the data code of RGB primary color of the pixel,
   wherein in calculating the similarity degree, a pixel difference value of each of the pixels is obtained, and a total difference value of one image frame is obtained,
   wherein in calculating the similarity degree, an exclusive-or (XOR) algorithm is used to calculate the pixel difference value, wherein a formula of the XOR algorithm is:

$P(x, y)=XOR(left(x, y), right(x, y))$ wherein the left (x, y) is regarded as the data code of the RGB primary color of the pixel positioning coordinate site (x, y) of the left-eye image, the right (x, y) is regarded as the data code of the RGB primary color of the pixel positioning coordinate site (x, y) of the right-eye image, and the P (x, y) is regarded as the pixel difference value between the pixel positioning coordinate site (x, y) of the left-eye image and the pixel positioning coordinate site (x, y) of the right-eye image;

the XOR algorithm is performed for each of bits of the data code of the RGB primary color of the pixels of the left-eye image and the right-eye image, and the pixels of the left-eye image and the right-eye image are corresponding in position; when values of corresponding bits of the pixels of left (x, y) and right (x, y) are same, number 0 is output; when the values of corresponding bits of the pixels of left (x, y) and right (x, y) are different, number 1 is output; XOR values of different bits of the pixels of left (x, y) and right (x, y) are accumulated to obtain the pixel difference value P between the two corresponding pixels.

2. A liquid crystal display (LCD) device, comprising:
   an extracting unit that extracts an image frame from a video;
   a dividing unit that divides the image frame into a left-eye image and a right-eye image;
   a similarity degree detection unit that calculates a similarity degree between the left-eye image and the right-eye image; and
   an outputting unit of a film resource format that controls to output a control signal of the film resource format corresponding to the similarity degree, wherein the similarity degree detection unit comprises an identification sub-unit and a difference-value-calculation sub-unit; the identification sub-unit identifies and collects data codes of RGB primary color of corresponding pixels of the left-eye image and the right-eye image in position, and the difference-value-calculation sub-unit calculates and obtains pixel difference values of the corresponding pixels through an exclusive or (XOR) algorithm and according to the data codes of the RGB primary color of the corresponding pixels, and accumulates all pixel difference values to obtain the total difference value between the left-eye image and the right-eye image; the total difference values corresponding to different image arrangements compared to obtain a minimum total difference value;
   the similarity degree detection unit further comprises a similarity degree determination sub-unit, and the similarity degree determination sub-unit comprises a threshold; if the minimum total difference value is less than the threshold, the outputting unit of the film resource format outputs the control signal controlling the film resource format of the 3D image of the image arrangement having the minimum total difference value: if the minimum total difference value is equal to or greater than the threshold, a new image frame is extracted, and the similarity degree is calculated again.

3. The LCD device of Claim 2, wherein the extracting unit, the dividing unit, the similarity degree detection unit, and the outputting unit of the film resource format are arranged in a double data rate (DDR) assembly of a timing controller (TCON) chip of the LCD device; the dividing unit comprises a left and right division sub-unit, an upper and lower division sub-unit, an interlaced division sub-unit, and an interlaced column division sub-unit.

* * * * *